United States Patent
Sheridan

(10) Patent No.: US 11,125,167 B2
(45) Date of Patent: Sep. 21, 2021

(54) FUNDAMENTAL GEAR SYSTEM ARCHITECTURE

(71) Applicant: United Technologies Corporation, Farmington, CT (US)

(72) Inventor: William G. Sheridan, Southington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 234 days.

(21) Appl. No.: 16/291,392

(22) Filed: Mar. 4, 2019

(65) Prior Publication Data
US 2019/0195140 A1 Jun. 27, 2019

Related U.S. Application Data

(63) Continuation of application No. 14/190,159, filed on Feb. 26, 2014, now Pat. No. 10,221,770, which is a
(Continued)

(51) Int. Cl.
*F02C 7/36* (2006.01)
*F02C 7/06* (2006.01)
(Continued)

(52) U.S. Cl.
CPC .............. *F02C 7/36* (2013.01); *F01D 25/18* (2013.01); *F02C 3/107* (2013.01); *F02C 7/06* (2013.01);
(Continued)

(58) Field of Classification Search
CPC .. F01D 25/18; F02C 3/107; F02C 7/06; F05D 2260/4031
(Continued)

(56) References Cited

U.S. PATENT DOCUMENTS 2,258,792 A 4/1941 New
2,826,255 A * 3/1958 Peterson ................. B64C 11/46
416/32

(Continued)

FOREIGN PATENT DOCUMENTS

EP 0791383 8/1997
EP 1142850 10/2001
(Continued)

OTHER PUBLICATIONS

Bill Gunston, "Pratt & Whitney PW8000," Jane's Aero-Engines (JA, No. 7), Mar. 1, 2000, pp. 510-512.
(Continued)

*Primary Examiner* — Woody A Lee, Jr.
(74) *Attorney, Agent, or Firm* — Carlson, Gaskey & Olds, P.C.

(57) ABSTRACT

A fan drive gear system for a gas turbine engine includes a gear system that provides a speed reduction between a fan drive turbine and a fan and a mount flexibly supporting portions of the gear system. A lubrication system supporting the fan drive gear system provides lubricant to the gear system and removes thermal energy produced by the gear system. The lubrication system includes a capacity for removing thermal energy equal to less than about 2% of power input into the gear system.

20 Claims, 3 Drawing Sheets

Related U.S. Application Data continuation of application No. PCT/US2013/041761, filed on May 20, 2013, which is a continuation of application No. 13/557,614, filed on Jul. 25, 2012, now Pat. No. 8,572,943.

(60) Provisional application No. 61/653,731, filed on May 31, 2012.

(51) Int. Cl.
*F01D 25/18* (2006.01)
*F02K 3/06* (2006.01)
*F02C 3/107* (2006.01)

(52) U.S. Cl.
CPC ........ *F02K 3/06* (2013.01); *F05D 2260/4031* (2013.01); *Y02T 50/60* (2013.01)

(58) Field of Classification Search
USPC .......... 60/39.08, 805; 415/112, 124.1, 124.2, 415/175; 184/6.11, 6.12, 104.1
See application file for complete search history.

(56) References Cited

U.S. PATENT DOCUMENTS

| | | | |
|---|---|---|---|
| 2,936,655 A | 5/1960 | Peterson et al. | |
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,664,612 A | 5/1972 | Skidmore et al. | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,020,632 A * | 5/1977 | Coffinberry | F02C 7/22 60/773 |
| 4,130,872 A | 12/1978 | Harloff | |
| 4,284,174 A | 8/1981 | Salvana et al. | |
| 4,289,360 A | 9/1981 | Zirin | |
| 4,358,969 A * | 11/1982 | Silvestri | F16H 1/46 475/31 |
| 4,423,333 A * | 12/1983 | Rossman | F03D 7/0224 290/44 |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,634,767 A | 6/1997 | Dawson | |
| 5,677,060 A | 10/1997 | Terentieva et al. | |
| 5,720,694 A * | 2/1998 | Jang | F16H 61/0206 477/116 |
| 5,778,659 A | 7/1998 | Duesler et al. | |
| 5,809,843 A * | 9/1998 | Barger | F16F 15/02 74/574.4 |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 * | 5/2001 | Sheridan | F16H 1/2827 184/6.12 |
| 6,223,872 B1 * | 5/2001 | Heller | F16F 15/1207 192/213 |
| 6,315,815 B1 | 11/2001 | Spadaccini et al. | |
| 6,318,070 B1 | 11/2001 | Rey et al. | |
| 6,330,525 B1 * | 12/2001 | Hays | F04D 15/0088 702/183 |
| 6,354,413 B2 * | 3/2002 | Heller | F16F 15/1207 192/213 |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,789,522 B2 * | 9/2004 | Seymour | F02B 61/04 123/192.2 |
| 6,814,541 B2 | 11/2004 | Evans et al. | |
| 6,883,303 B1 | 4/2005 | Seda | |
| 7,021,042 B2 | 4/2006 | Law | |
| 7,219,490 B2 | 1/2007 | Dev | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,600,971 B2 * | 10/2009 | Damgaard | F03D 15/10 416/1 |
| 7,632,064 B2 | 12/2009 | Somanath | |
| 7,658,060 B2 | 2/2010 | Zysman et al. | |
| 7,662,059 B2 | 2/2010 | McCune | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,926,260 B2 | 4/2011 | Sheridan et al. | |
| 7,970,556 B2 * | 6/2011 | Hala | G01M 13/028 702/34 |
| 7,997,868 B1 | 8/2011 | Liang et al. | |
| 8,205,432 B2 | 6/2012 | Sheridan | |
| 8,508,059 B2 * | 8/2013 | Burton | F01D 15/10 290/4 R |
| 8,568,099 B2 * | 10/2013 | Sabannavar | F03D 15/00 416/170 R |
| 8,572,943 B1 * | 11/2013 | Sheridan | F02C 7/06 60/39.08 |
| 8,672,801 B2 * | 3/2014 | McCune | F16H 1/48 475/346 |
| 8,684,303 B2 * | 4/2014 | Suciu | B64D 27/26 244/53 R |
| 9,840,969 B2 * | 12/2017 | Sheridan | F02C 7/36 |
| 2001/0015308 A1 * | 8/2001 | Heller | F16F 15/139 192/3.29 |
| 2005/0257528 A1 * | 11/2005 | Dunbar, Jr. | F02K 3/10 60/761 |
| 2006/0228206 A1 | 10/2006 | Decker et al. | |
| 2007/0036655 A1 * | 2/2007 | Damgaard | F03D 13/40 416/170 R |
| 2008/0003096 A1 | 1/2008 | Kohli et al. | |
| 2008/0116009 A1 | 5/2008 | Sheridan et al. | |
| 2008/0317588 A1 | 12/2008 | Grabowski et al. | |
| 2009/0056343 A1 | 3/2009 | Suciu et al. | |
| 2009/0314881 A1 | 12/2009 | Suciu et al. | |
| 2010/0013239 A1 * | 1/2010 | Damgaard | F03D 80/70 290/55 |
| 2010/0105516 A1 * | 4/2010 | Sheridan | F01D 25/18 475/346 |
| 2010/0148396 A1 | 6/2010 | Xie et al. | |
| 2010/0198534 A1 * | 8/2010 | Hala | G01M 13/028 702/56 |
| 2010/0212281 A1 | 8/2010 | Sheridan | |
| 2010/0218483 A1 | 9/2010 | Smith | |
| 2010/0236216 A1 * | 9/2010 | Winter | F02C 7/32 60/204 |
| 2010/0296947 A1 * | 11/2010 | DiBenedetto | F01D 25/164 417/53 |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2013/0116937 A1 * | 5/2013 | Calhoun | G06F 17/00 702/35 |

(56) References Cited

U.S. PATENT DOCUMENTS

| | | |
|---|---|---|
| 2013/0192266 A1 | 8/2013 | Houston et al. |
| 2014/0154054 A1 | 6/2014 | Sheridan et al. |
| 2015/0096303 A1 | 4/2015 | Schwarz et al. |

FOREIGN PATENT DOCUMENTS

| | | |
|---|---|---|
| EP | 2327859 A2 | 6/2011 |
| EP | 2532841 A2 | 12/2012 |
| GB | 1516041 | 6/1978 |
| GB | 2041090 | 9/1980 |
| GB | 2204642 A | 11/1988 |
| GB | 2426792 | 12/2006 |
| JP | 2008038902 A | 2/2008 |
| RU | 2346176 C1 | 2/2009 |
| RU | 2347928 C1 | 2/2009 |
| RU | 2358375 C2 | 6/2009 |
| SU | 198845 A1 | 6/1967 |
| WO | 2007038674 | 4/2007 |
| WO | 2014028085 A2 | 2/2014 |

OTHER PUBLICATIONS

Kandebo, S. W., "Pratt & Whitney Launches Geared Turbofan Engine," Aviation Week and Space Technology, McGraw-Hill Company, New York, NY, vol. 148, No. 8, Feb. 23, 1992, pp. 32-34.

Dale Rauch, "Design Study of an Air Pump and Integral Lift Engine ALF-504 Using the Lycoming 502 Core," NASA Report, Jul. 31, 1972.

European Search Report for European Application No. 20173980.2 dated Nov. 16, 2020.

Team CCJ, "Turbine blade,vane cooling—a primer", 2018, https://www.ccj-online.com/turbine-blade-vane-cooling-a-primer/ retrieved on Oct. 9, 2019 (Year: 2018).

Princeton, "Composite Materials", https://www.princeton.edu/-humcomp/bikes/design/desi_30.htm, on Oct. 9. 2019 (Year: 1997).

Philip P Walsh, "Gas Turbine Performance", 2004, John Wiley and Sons, Blackwell Science, Second Edition, p. 214, subheading"5.11.6 Radial flow turbines versus axial flow turbines" (Year: 2004).

Power Technology, "GE's H-Series Breaks 60% Fuel Efficiency Barrier", 2007, retrieved from https://www.power-technology.com/features/feature 1084/ (Year: 2007).

Anderson, N.E., Loewenthal, S.H., and Black, J.D. (1986). An analytical method to predict efficiency of aircraft gearboxes. ASME J. Mech., Trans., and Automation, Sep. 1, 1986. pp. 424-432.

The Singapore Search Report and Written Opinion for SG Application No. 10201705204X, dated Feb. 22, 2019.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite—element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-726 and 764-771.

Spadaccini, L.J., and Huang, H. (2002). On-line fuel deoxygenation for coke suppression. ASME, Jun. 2002. pp. 1-7.

Darrah, S. (1987). Jet fuel deoxygenation. Interim Report for Period Mar. 1987-Jul. 1988. pp. 1-22.

Bucknell, R.L. (1973). Influence of fuels and lubricants on turbine engine design and performance, fuel and lubricant analyses. Final Technical Report, Mar. 1971-Mar. 1973. pp. 1-252.

Hazlett, R.N. (1991). Thermal oxidation stability of aviation turbine fuels. Philadelphia, PA: ASTM. pp. 1-163.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Edwards, T. and Zabarnick, S. (1993). Supercritical fuel deposition mechanisms. Ind. Eng. Chem. Res. vol. 32. 1993. pp. 3117-3122.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

Matsumoto, T., Toshiro, U., Kishida, A., Tsutomu, F., Maruyama, I., and Akashi, M. (1996). Novel functional polymers: Poly (dimethylsiloxane)—polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.N. and Schairer, E.T. (1977). Analysis of turbofan propulsion system weight and dimension. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from:

(56) References Cited

OTHER PUBLICATIONS https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Summons to Attend Oral Proceedings for European Application No. 17175088.8 dated Nov. 22, 2019.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Appl. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.

(56) References Cited

OTHER PUBLICATIONS

Clarke, D.R. and Levi, C.G. (2003). Materials design for the next generation thermal barrier coatings. Annual. Rev. Mater. Res. vol. 33. 2003. pp. 383-417.

Lee, K.N. (2000). Current status of environmental barrier coatings for Si-Based ceramics. Surface and Coatings Technology 133-134, 2000. pp. 1-7.

Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Shah, D.M. (1992). MoSi2 and other silicides as high temperature structural materials. Superalloys 1992. The Minerals, Metals, & Materials Society. pp. 409-422.

Zhao, J.C. and Westbrook, J.H. (2003). Ultrahigh-temperature materials for jet engines. MRS Bulletin. vol. 28(9). Sep. 2003. pp. 622-630.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Jacobson, N.S. (1993). Corrosion of silicon-based ceramics in combustion environments. J. Am. Ceram. Soc. 76(1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. Nasa Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, fith Edition. (2007). vol. 2, N-Z. p. 1888.

Lynwander, P. (1983). Gear drive systems: Design and application. New York, New York: Marcel Dekker, Inc. pp. 145, 355-358.

(56) References Cited

OTHER PUBLICATIONS

Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-2007.

Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to-3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13 2007. Berlin, Germany. pp. 1-12.
About GasTurb. Retrieved Jun. 26, 2018 from: http://gasturb.de/about-gasturb.html.
Kurzke, J. (2001). GasTurb 9: A porgram to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. Iexandria, VA: American Gear Manufacturers Association. pp. 1-48.
Daly, M. Ed. (2007). Jane's Aero-Engine. Issue Twenty-three. Mar. 2008. p. 707-712.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.

(56) References Cited

OTHER PUBLICATIONS

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Gray, D.E. and Gardner, W.B. (1983). Energy efficient engine program technology benefit/cost study—vol. 2. NASA CR-174766. Oct. 1983. pp. 1-118.

Munt, R. (1981). Aircraft technology assessment: Progress in low emissions engine. Technical Report. May 1981. pp. 1-171.

Waters, M.H. and Schairer, E.T. (1977). Analysis of turbofan propulsion system weight and dimension. NASA Technical Memorandum. Jan. 1977. pp. 1-65.

Avco Lycoming Divison. ALF 502L Maintenance Manual. Apr. 1981. pp. 1-118.

Type Certificate Data Sheet No. E6NE. Department of Transportation Federal Aviation Administration. Jun. 7, 2002. pp. 1-10.

Trembley, Jr., H.F. (1977). Determination of effects of ambient conditions on aircraft engine emissions. Prepared for Environmental Protection Agency. Ann Arbor, Michigan. Sep. 1977 pp. 1-256.

Honeywell LF502. Jane's Aero-engines, Aero-engines—Turbofan. Aug. 17, 2016.

Rauch, D. (1972). Design study of an air pump and integral lift engine ALF-504 using the Lycoming 502 core. Prepare for NASA. Jul. 1972. pp. 1-182.

Dassault Falcon 900EX Easy Systems Summary. Retrieved from: http://www.smartcockpit.com/docs/F900EX-Engines.pdf pp. 1-31.

Honeywell TFE731 Pilot Tips. pp. 1-143.

Honeywell TFE731-5AR to-5BR Engine Conversion Program. Sep. 2005. pp. 1-4.

Garret TFE731 Turbofan Engine (CAT C). Chapter 79: Lubrciation System. TTFE731 Issue 2. 2010. pp. 1-24.

McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.

\* cited by examiner

FUNDAMENTAL GEAR SYSTEM ARCHITECTURE

CROSS-REFERENCE TO RELATED APPLICATION

This application is a continuation of U.S. patent application Ser. No. 14/190,159 filed on Feb. 26, 2014, which is a continuation of International Application No. PCT/US2013/041761 filed May 20, 2013 that claims priority to U.S. Provisional Application No. 61/653,731 filed May 31, 2012 and U.S. application Ser. No. 13/557,614 filed Jul. 25, 2012, now U.S. Pat. No. 8,572,943 granted Nov. 5, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. A speed reduction device such as an epicyclical gear assembly may be utilized to drive the fan section such that the fan section may rotate at a speed different than the turbine section so as to increase the overall propulsive efficiency of the engine. The efficiency at which the gear assembly transfers power is a consideration in the development of a gear driven fan. Power or energy not transferred through the gearbox typically results in the generation of heat that is removed with a lubrication system. The more heat generated, the larger and heavier the lubrication system.

Although geared architectures can provide improved propulsive efficiency, other factors including heat removal and lubrication can detract from the improved propulsive efficiency. Accordingly, turbine engine manufacturers continue to seek further improvements to engine performance including improvements to thermal, transfer and propulsive efficiencies.

SUMMARY

A fan drive gear system for a gas turbine engine according to an exemplary embodiment of this disclosure, among other possible things includes a gear system that provides a speed reduction between a fan drive turbine and a fan. A lubrication system configures to provide lubricant to the gear system and to remove thermal energy produced by the gear system. The lubrication system includes a capacity for removing thermal energy greater than zero and less than about 2% of power input into the gear system during operation of the engine.

In a further embodiment of any of the foregoing fan drive gear systems, the gear system transfers power input from the fan drive turbine to the fan at an efficiency greater than about 98% and less than 100%.

In a further embodiment of any of the foregoing fan drive gear systems, the lubrication system includes a capacity for removing thermal energy equal to less than about 1% of power input into the gear system.

In a further embodiment of any of the foregoing fan drive gear systems, the lubrication system includes a main lubrication system configured to provide lubricant to the gear system and an auxiliary lubrication system configured to provide lubricant to the gear system responsive to an interruption of lubricant flow from the main lubrication system.

In a further embodiment of any of the foregoing fan drive gear systems, the gear system is flexibly supported for movement relative to a static structure of the engine.

In a further embodiment of any of the foregoing fan drive gear systems, a load limiter is configured to limit movement of the gear system relative to the static structure of the engine responsive to an unbalanced condition.

In a further embodiment of any of the foregoing fan drive gear systems, the gear system includes a sun gear that is configured to be driven by the fan drive turbine, a non-rotatable carrier, a plurality of star gears that are supported on the carrier and that are configured to be driven by the sun gear, and a ring gear circumscribing the plurality of star gears.

In a further embodiment of any of the foregoing fan drive gear systems, includes a first flexible coupling between an input shaft that is configured to be driven by the fan drive turbine and the sun gear, and a second flexible coupling between a fixed structure and the carrier.

In a further embodiment of any of the foregoing fan drive gear systems, the gear system includes a sun gear that is configured to be driven by the fan drive turbine, a rotatable carrier, a plurality of planet gears that are supported on the carrier and that are configured to be driven by the sun gear, and a ring gear circumscribing the plurality of planet gears.

In a further embodiment of any of the foregoing fan drive gear systems, includes a first flexible coupling between an input shaft that is configured to be driven by the fan drive turbine and the sun gear, and a second flexible coupling between a fixed structure and the ring gear.

A gas turbine engine according to an exemplary embodiment of this disclosure, among other possible things includes a fan including a plurality of fan blades rotatable about an axis, a fan drive turbine, a gear system that provides a speed reduction between the fan drive turbine and the fan, the gear system configured to transfer power input from the fan drive turbine to the fan at an efficiency greater than about 98% and less than 100%, and a lubrication system configured to provide lubricant to the gear system and to remove thermal energy from the gear system produced by the gear system during operation of the engine.

In a further embodiment of any of the foregoing gas turbine engines, the lubrication system includes a capacity for removing thermal energy equal to less than about 2% of power input into the gear system during operation of the engine.

In a further embodiment of any of the foregoing gas turbine engines, the lubrication system includes a capacity for removing thermal energy equal to less than about 1% of power input into the gear system during operation of the engine.

In a further embodiment of any of the foregoing gas turbine engines, the lubrication system includes a main lubrication system configured to provide lubricant to the gear system and an auxiliary lubrication system configured to provide lubricant to the gear system responsive to an interruption of lubricant flow from the main lubrication system.

In a further embodiment of any of the foregoing gas turbine engines, the gear system includes a sun gear that is configured to be driven by the fan drive turbine, a non-rotatable carrier, a plurality of star gears that are supported on the carrier and that are configured to be driven by the sun gear, and a ring gear circumscribing the plurality of star gears. The gear system is flexibly supported for accommodating movement relative to an engine static structure.

In a further embodiment of any of the foregoing gas turbine engines, includes a first flexible coupling between an input shaft that is configured to be driven by the fan drive turbine and the sun gear, and a second flexible coupling between the engine static structure and the carrier.

In a further embodiment of any of the foregoing gas turbine engines, the gear system includes a sun gear that is configured to be driven by the fan drive turbine, a rotatable carrier, a plurality of planet gears that are supported on the carrier and that are configured to be driven by the sun gear, and a ring gear circumscribing the plurality of planet gears. The gear system is flexibly supported for accommodating movement relative to an engine static structure.

In a further embodiment of any of the foregoing gas turbine engines, includes a first flexible coupling between an input shaft that is configured to be driven by the fan drive turbine and the sun gear, and a second flexible coupling between the engine static structure and the ring gear.

In a further embodiment of any of the foregoing gas turbine engines, the gear system includes a gear reduction having a gear ratio greater than about 2.3.

In a further embodiment of any of the foregoing gas turbine engines, the fan delivers a first portion of air into a bypass duct and a second portion of air into a compressor of the gas turbine engine. A bypass ratio, which is defined as the first portion divided by the second portion, is greater than about 10.0.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
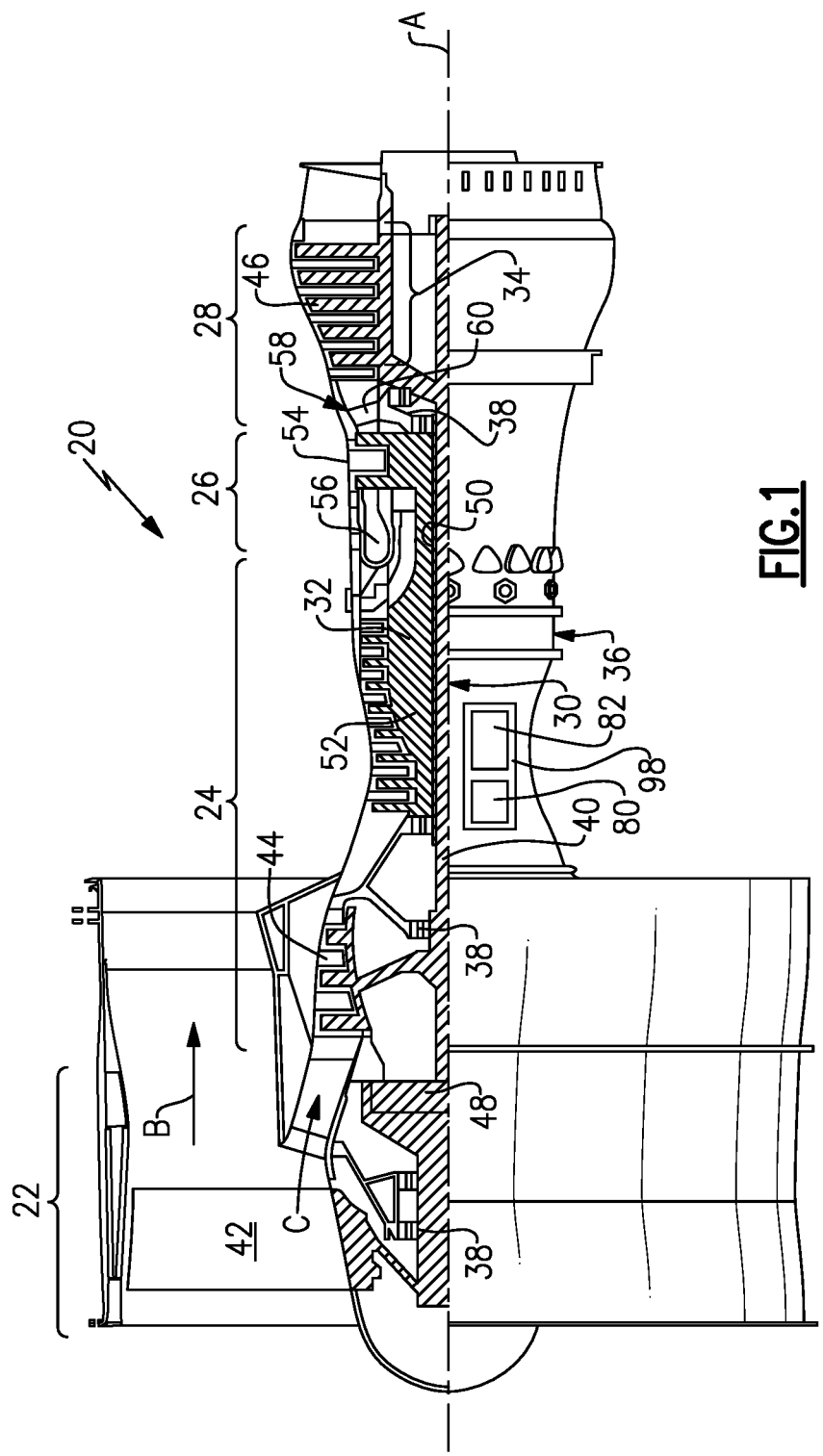
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram \,^\circ R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine includes a lubrication system 98. The lubrication system 98 provides lubricant flow to the rotating components of the gas turbine engine including the bearing assemblies 38 and the geared architecture 48. The lubrication system 98 further provides for the removal of heat generated in the various bearing systems and the geared architecture 48.

The example lubrication system 98 includes a main system 80 that provides lubrication during normal operating conditions of the gas turbine engine. An auxiliary system 82 is also included to supplement operation of the main lubrication system 80. The size and weight of the lubrication system 90 is directly related to its capacity for removing heat from the geared architecture 48. The greater the need for removal of heat, the larger and heavier the lubrication system 98 becomes. The amount of heat generated by the geared architecture 48 is therefore an important consideration in the configuration of a fan drive gear system.

Figure 2:
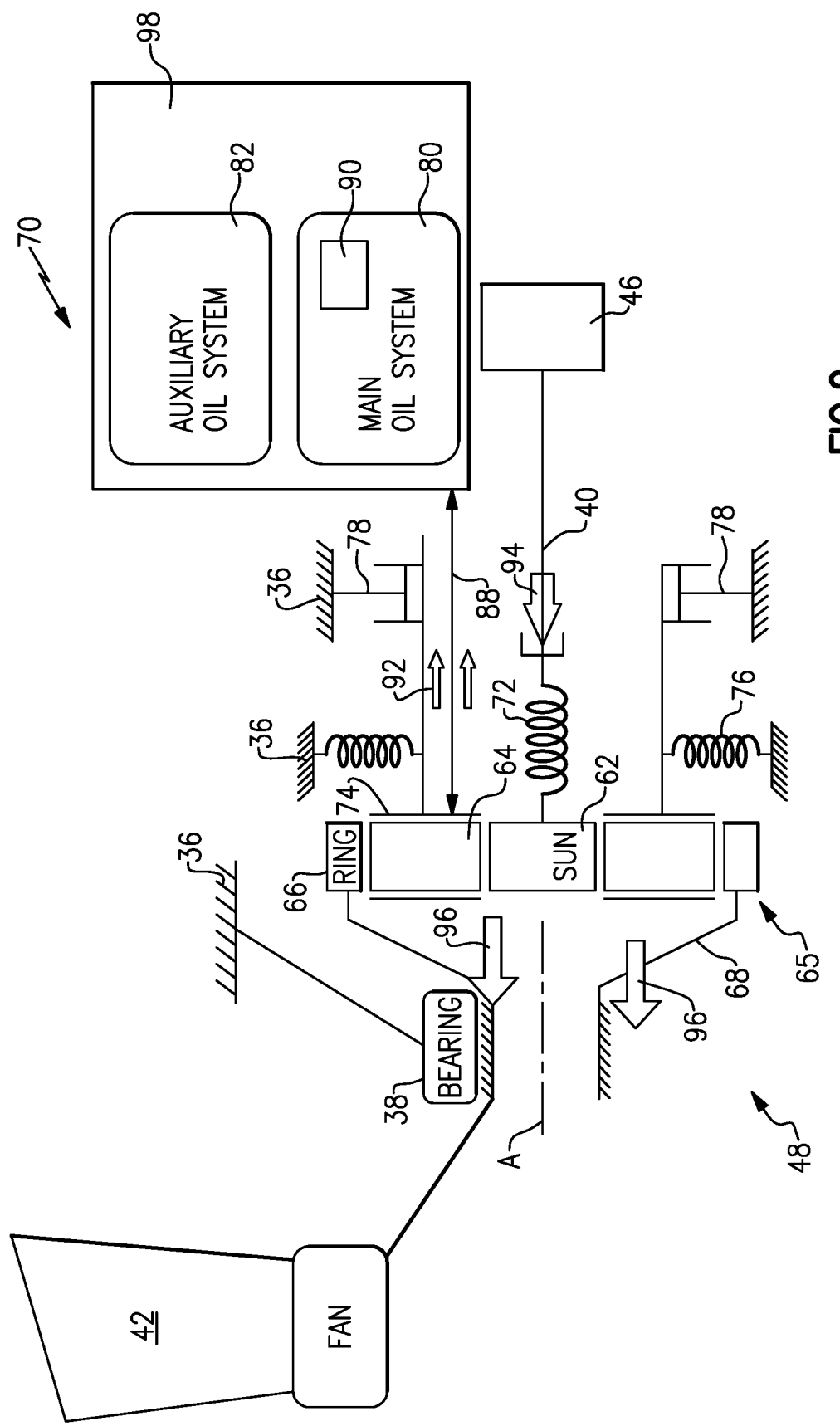
FIG. 2 is a schematic view of an example fan drive gear system including star epicyclical geared architecture.

Referring to FIG. 2 with continued reference to FIG. 1, the example geared architecture 48 is part of a fan drive gear system 70. The example geared architecture 48 comprises a gear assembly 65 that includes a sun gear 62 driven by a fan drive turbine 46. In this example, the fan drive turbine is the low pressure turbine 46. The sun gear 62 in turn drives intermediate gears 64 mounted on a carrier 74 by journal bearings. The carrier 74 is grounded to the static engine structure 36 and therefore the intermediate gears 64 do not orbit about the sun gear 62. The intermediate gears 64 intermesh and drive a ring gear 66 coupled to a fan shaft 68 to drive the fan 42.

The gear assembly 65 is flexibly mounted such that it may be isolated from vibrational and transient movement that could disturb alignment between the gears 62, 64 and 66. In this example, flexible mounts 76 support the carrier 74 and accommodate relative movement between the gear assembly 65 and the static structure 36. The example flexible mount 76 includes a spring rate that accommodates deflections that occur during normal operation of the fan drive gear system 70.

Power input through the inner shaft 40 of the fan drive turbine 46 is transmitted through a flexible coupling 72. The flexible coupling 72 also includes a spring rate that allows a defined amount of deflection and misalignment such that components of the gear assembly 65 are not driven out of alignment.

Although some relative movement is compensated by the flexible coupling 72 and the flexible mounts 76, movement beyond a desired limitation can detrimentally affect meshing engagement between the gears and therefore a load limiting device 78 is provided as part of the gear box mounting structure. The load limiter 78 constrains movement of the gear box 65. The limiter 78 further provides a stop that reacts to unbalanced loads on the gear box 65. Accordingly, the limiter prevents radial unbalanced loads and/or torsional overloads from damaging the gas turbine engine 20.

The example fan drive gear system 70 is supported by a lubrication system 98. The lubrication system 98 provides for lubrication and cooling of the gears 62, 64 and 66 along with bearings supporting rotation of the gears. It is desirable to circulate lubricant as quickly as possible to maintain a desired temperature. Power transmission efficiency through the gear box 65 is detrimentally affected by elevated temperatures.

In this example, the lubricant system 98 includes a main system 80 that provides the desired lubricant flow through a plurality of conduits schematically illustrated by the line 88 to and from the gear box 65. The main oil system 80 also transmits heat, schematically by arrows 92, away from the gear box 65 to maintain a desired temperature.

The lubrication system 98 also includes the auxiliary oil system 82 that supplies oil flow to the gear box 65 in response to a temporary interruption in lubricant flow from the main oil system 80.

The efficiency of the example gear box 65 and overall geared architecture 48 is a function of the power input, schematically indicated by arrow 94, through the shaft 40 relative to power output, schematically indicated by arrows 96, to the fan shaft 68. Power input 94 compared to the amount of power output 96 is a measure of gear box efficiency. The example gear box 65 operates at an efficiency of greater than about 98%. In another disclosed example, the example gear box 65 operates at an efficiency greater than about 99%.

The disclosed efficiency is a measure of the amount of power 94 that is specifically transferred to the fan shaft 68 to rotate the fan 42. Power that is not transmitted through the gear box 65 is lost as heat and reduces the overall efficiency of the fan drive gear system 70. Any deficit between the input power 94 and output power 96 results in the generation of heat. Accordingly, in this example, the deficit of between 1-2% between the input power 94 and output power 96 generates heat. In other words, between 1% and 2% of the input power 94 is converted to heat energy that must be accommodated by the lubrication system 98 to maintain a working lubricant temperature within operational limits.

The example lubricant system 98 provides for the removal of thermal energy equal to or less than about 2% of the input power 94 from the low pressure turbine 46. In another non-limiting embodiment of the example fan drive gear system 70, the efficiency of the gear box 65 is greater than about 99% such that only 1% of power input from the low pressure turbine 46 is transferred into heat energy that must be handled by the lubricant system 98.

As appreciated, the larger the capacity for handling and removing thermal energy, the larger and heavier the lubricant system 98. In this example, the main oil system includes a heat exchanger 90 that accommodates heat 92 that is generated within the gear box 65. The heat exchanger 90 is an example of one element of the lubrication system 98 that is scaled to the desired capacity for removing thermal energy. As appreciated, other elements, such as for example lubricant pumps, conduit size along with overall lubricant quantity within the lubrication system 98 would also be increased in size and weight to provide increased cooling capacity. Accordingly, it is desirable to increase power transfer efficiency to reduce required overall heat transfer capacity of lubrication system 98.

In this example, the high efficiency of the example gear box 65 enables a relatively small and light lubricant system 98. The example lubricant system 98 includes features that can accommodate thermal energy generated by no more than about 2% of the input power 94. In other words, the lubrication system 98 has an overall maximum capacity for removing thermal energy equal to no more than about 2% of the input power provided by the low pressure turbine 46.

Greater amounts of capacity for removal of thermal energy results in an overall increase in the size and weight of the lubrication system 98. Lubrication systems that are required to remove greater than about 2% of input power 94 require larger lubricant systems 98 that can detrimentally impact overall engine efficiency and detract from the propulsion efficiencies provided by the reduction in fan speed.

Figure 3:
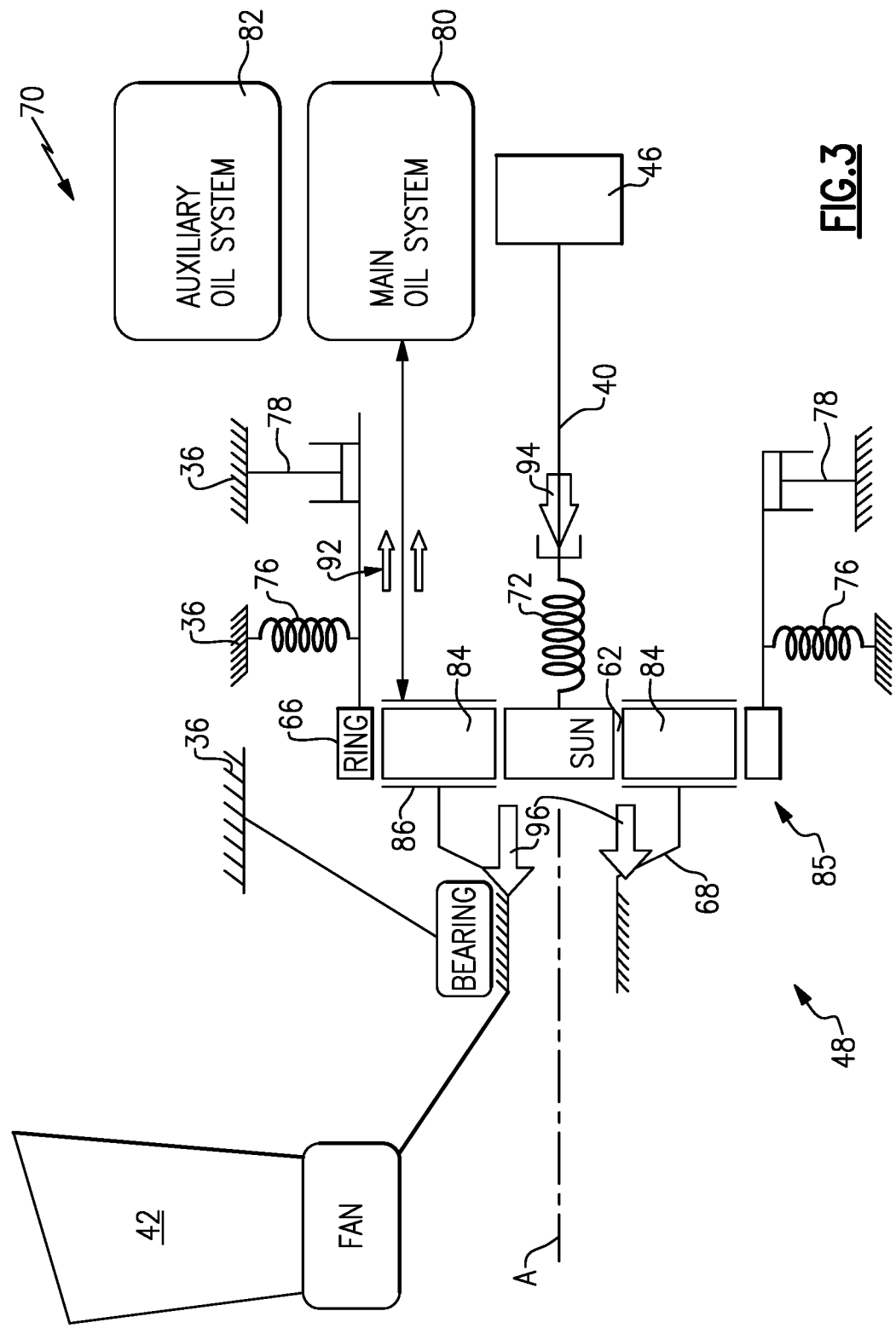
FIG. 3 is a schematic view of an example fan drive gear system including planetary epicyclical geared architecture.

Referring to FIG. 3 with continued reference to FIG. 1, another example epicyclical gear box 85 is disclosed and comprises a planetary configuration. In a planetary configuration, planet gears 84 are supported on a carrier 86 that is rotatable about the engine axis A. The sun gear 62 remains driven by the inner shaft 40 and the low pressure turbine 46. The ring gear 66 is mounted to a fixed structure 36 such that it does not rotate about the axis. Accordingly, rotation of the sun gear 62 drives the planet gears 84 within the ring gear 66. The planet gears 84 are supported on the rotatable carrier 86 that in turn drives the fan shaft 68. In this configuration, the fan shaft 68 and the sun gear 62 rotate in a common direction, while the planet gears 84 individually rotate in a direction opposite to the sun gear 62 but collectively rotate about the sun gear 62 in the same direction as the rotation of the sun gear 62.

The example planetary gear box illustrated in FIG. 3 includes the ring gear 66 that is supported by flexible mount 76. The flexible mount 76 allows some movement of the gearbox 85 to maintain a desired alignment between meshing teeth of the gears 62, 84, 66. The limiter 78 prevents movement of the planetary gear box 85 beyond desired limits to prevent potential damage caused by radial imbalances and/or torsional loads.

The example low pressure turbine 46 inputs power 94 to drive the gear box 85. As in the previous example, the example gear box 85 transmits more than about 98% of the input power 94 to the fan drive shaft 68 as output power 96. In another example, the gear box 85 transmits more than about 99% of the input power 94 to the fan drive shaft 68 as output power 96.

The difference between the input power 94 and the output power 96 is converted into heat energy that is removed by the lubrication system 98. In this example, the lubrication system 98 has a capacity of removing no more heat 92 than is generated by about 2% of the input power 94 from the low pressure turbine 46. In another example, the lubrication system 98 has a capacity of removing no more heat 92 than is generated by about 1% of the input power 94. Accordingly, the efficiency provided by the example gear box 85 enables the lubrication system 98 to be of size that does not detract from the propulsive efficiency realized by turning the fan section 22 and low pressure turbine 46 at separate and nearer optimal speeds.

Accordingly, the example fan drive gear system provides for the improvement and realization of propulsive efficiencies by limiting losses in the form of thermal energy, thereby enabling utilization of a lower capacity and sized lubrication system.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fan including a plurality of fan blades rotatable about an axis;
   a bypass duct;
   a compressor section;
   a bypass ratio greater than ten (10), the bypass ratio being defined as the portion of air delivered into the bypass duct divided by the amount of air delivered into the compressor section;
   a combustor in fluid communication with the compressor section;
   a fan drive turbine in communication with the combustor, the fan drive turbine comprising a pressure ratio greater than about 5, wherein the fan drive turbine further includes an inlet having an inlet pressure, and an outlet that is prior to any exhaust nozzle and having an outlet pressure, and the pressure ratio of the fan drive turbine is a ratio of the inlet pressure to the outlet pressure;
   a gear system providing a speed reduction between the fan drive turbine and the fan and transferring power input from the fan drive turbine to the fan at an efficiency greater than 98%, wherein the gear system further comprises a gear reduction ratio of greater than 2.3;
   a lubrication system providing lubricant to rotating components of the engine including the gear system and removing thermal energy from the lubricant, wherein the lubrication system comprises a first lubrication system providing lubricant flow to the gear system, and a second lubrication system supplementing operation of the first lubrication system by providing supplementary lubricant flow to the gear system in response to an interruption in lubricant flow from the first lubrication system; and a second turbine is in communication with the combustor, wherein the second turbine is an at least two stage turbine, and the fan drive turbine includes less than six turbine rotors.

2. The gas turbine engine recited in claim 1, wherein a ratio between the number of fan blades and the number of fan drive turbine rotors is between 3.3 and 8.6.

3. The gas turbine engine recited in claim 2, wherein the plurality of fan blades is less than twenty (20).

4. The gas turbine engine recited in claim 3, further comprising a low corrected fan tip speed less than about 1150 ft/second, wherein the low corrected fan tip speed is an actual fan tip speed at an ambient temperature divided by [(Tram ° R)/518.7) 0.5], where T represents the ambient temperature in degrees Rankine.

5. The gas turbine engine recited in claim 4, wherein the gear system comprises a sun gear, a rotatable carrier, a plurality of planet gears supported on the carrier and driven by the sun gear, and a ring gear circumscribing the plurality of planet gears.

6. The gas turbine engine recited in claim 5, further comprising a mid-turbine frame between the fan drive turbine and the second turbine, the mid-turbine frame including at least one vane in a core airflow path functioning as an inlet guide vane for the fan drive turbine.

7. The gas turbine engine recited in claim 6, further comprising a gear support system including a spring rate that allows a defined amount of deflection and misalignment among at least some of the plurality of gears of the gear system.

8. The gas turbine engine recited in claim 7, wherein the gear support system includes a mount flexibly supporting the gear system relative to a static structure of the engine.

9. The gas turbine engine recited in claim 8, further comprising an input shaft arranged in a driving relationship to the fan drive turbine, wherein the gear support system includes a flexible support structure supporting at least one gear of the gear system relative to the input shaft.

10. The gas turbine engine recited in claim 9, wherein the mount extends radially from a static structure of the engine with respect to a central axis to accommodate radial movement between the gear system and the static structure.

11. A gas turbine engine comprising:
a fan including less than twenty (20) fan blades rotatable about an axis;
a compressor section;
a combustor in communication with the compressor section;
a bypass duct and a bypass ratio of a portion of air delivered into the bypass duct divided by the amount of air delivered into the compressor section is greater than ten (10);
a fan drive turbine in communication with the combustor, the fan drive turbine comprising less than six (6) fan drive turbine rotors, an inlet having an inlet pressure, an outlet prior to any exhaust nozzle and having an outlet pressure, a pressure ratio of the inlet pressure to the outlet pressure greater than about five (5), and a ratio of between the number of fan blades and the number of fan drive turbine rotors is between 3.3 and 8.6;
a bearing system supporting rotation of an inner shaft driven by the fan drive turbine and an outer shaft driven by a second turbine;
a fan drive gear system providing a speed reduction between the fan drive turbine and the fan of greater than 2.3, the fan drive gear system transferring power input from the fan drive turbine to the fan at an efficiency greater than 98% and less than 100%;
a lubrication system circulating lubricant to at least the bearing system and the fan drive gear system, the lubrication system has a maximum capacity for removing thermal energy from the lubricant equal of no more than 2% of power input into the fan drive gear system by the fan drive turbine during operation of the engine.

12. The gas turbine engine recited in claim 11, wherein the second turbine is a two stage turbine in communication with the combustor.

13. The gas turbine engine recited in claim 12, wherein the fan drive gear system comprises a sun gear, a rotatable carrier, a plurality of planet gears supported on the carrier and driven by the sun gear, and a ring gear circumscribing the plurality of planet gears.

14. The gas turbine engine recited in claim 13, further comprising a mid-turbine frame between the fan drive turbine and the second turbine, the mid-turbine frame including at least one vane in a core airflow path functioning as an inlet guide vane for the fan drive turbine.

15. The gas turbine engine recited in claim 14, further comprising a low corrected fan tip speed less than 1150 ft/second, wherein the low corrected fan tip speed is an actual fan tip speed at an ambient temperature divided by [(Tram ° R)/518.7) 0.5], where T represents the ambient temperature in degrees Rankine.

16. The gas turbine engine recited in claim 14, wherein the lubrication system has a maximum capacity for removing thermal energy from the lubricant equal to no more than 1% of power input into the fan drive gear system by the fan drive turbine during operation of the engine.

17. The gas turbine engine recited in claim 16, wherein the lubrication system comprises a first lubrication system providing lubricant flow to the fan drive gear system and the at least one bearing system, and a second lubrication system that supplies lubricant flow to the fan drive gear system in response to an interruption in lubricant flow from the first lubrication system.

18. A gas turbine engine comprising:
a fan including a plurality of fan blades rotatable about an axis and surrounded by a housing defining a bypass duct, wherein a fan pressure ratio across the plurality of fan blades alone is less than 1.45;
a compressor section axially aft of the fan;
a bypass ratio greater than ten (10), the bypass ratio being defined as the portion of air delivered into the bypass duct divided by the amount of air delivered into the compressor section;
a combustor in fluid communication with the compressor section;
a turbine section including a fan drive turbine and a second turbine in communication with the combustor;
a fan drive gear system providing a speed reduction between the fan drive turbine and the fan and transferring power input from the fan drive turbine to the fan at an efficiency greater than 98% and less than 100%, wherein the fan drive gear system further comprises a gear reduction ratio of greater than 2.3;

an input shaft arranged in a driving relationship to the fan drive turbine;
a gear support system including a flexible support structure supporting at least one gear of the gear system relative to the input shaft;
a lubrication system providing lubricant to rotating components of the engine including the gear system and removing thermal energy from the lubricant, the lubrication system has a maximum capacity for removing thermal energy from the lubricant equal of no more than 2% of power input into the fan drive gear system by the fan drive turbine during operation of the engine, wherein the lubrication system comprises a first lubrication system providing lubricant flow to the fan drive gear system and a second lubrication system supplementing operation of the first lubrication system by providing supplementary lubricant flow to at least the fan drive gear system in response to an interruption in lubricant flow from the first lubrication system.

19. The gas turbine engine recited in claim 18, wherein a ratio between the number of fan blades and a number of fan drive turbine rotors is between 3.3 and 8.6.

20. The gas turbine engine recited in claim 18, further comprising a mid-turbine frame between the fan drive turbine and the second turbine, the mid-turbine frame including at least one vane in a core airflow path functioning as an inlet guide vane for the fan drive turbine and the fan drive turbine includes between three and six stages and the second turbine is a two-stage second turbine.

* * * * *